H. B. SMITH.
MOLDING MACHINE.
No. 20,824. Patented July 6, 1858.
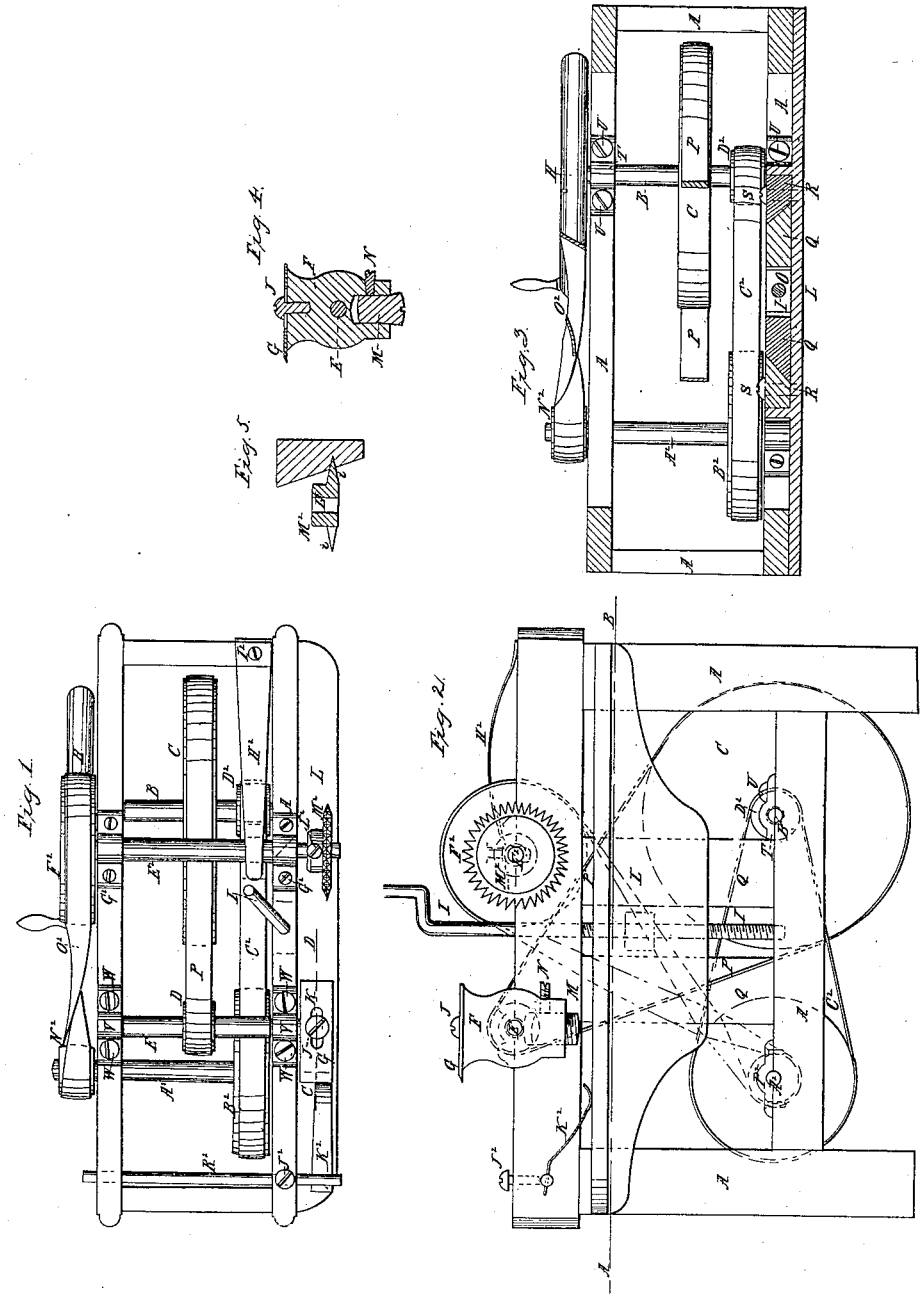

UNITED STATES PATENT OFFICE.

H. B. SMITH, OF LOWELL, MASSACHUSETTS.

ARRANGEMENT OF DEVICES FOR PLANING MOLDINGS.

Specification of Letters Patent No. 20,824, dated July 6, 1858.

*To all whom it may concern:*

Be it known that I, HEZEKIAH B. SMITH, of Lowell, in the county of Middlesex and Commonwealth of Massachusetts, have invented a novel and useful Improvement in Molding-Machines; and I hereby declare that the following specification, in connection with the accompanying drawings and references thereon, constitute a lucid, clear, and exact description of the construction and use of the same.

In referring to the said drawings Figure 1, denotes a plan or top view; Fig. 2, a side elevation of the same; Fig. 3, a longitudinal and transverse section on line A, B, Fig. 2. Fig. 4, is a section of the cutter head on line C, D, Fig. 1 showing the parts for balancing it. Fig. 5, shows a part transverse section of the spur feed wheel M², and a section of the beveled piece L³ for the molding, and the manner in which it is fed along; to be shaped as seen in red lines; by the spur feed wheel M² and its points *i*.

*Invention.*—The nature of my invention consists in the arrangement of an adjustable balance to the revolving cutter heads for cutting moldings, and in so constructing the table or platen with gibs or their equivalents, that it may be moved up and down, and caused to remain in any desired position by one single screw, and in an adjustable spur feed wheel so arranged as to be adjusted laterally as desired.

*Construction.*—To enable persons skilled in the art to which my invention appertains to construct and carry out the same, I will describe it as follows: I construct a frame of wood as seen at A, A, Figs. 1, 2, and 3, to which I suspend a driving shaft seen at B. Figs. 1, 2, and 3, in substantial bearings T, Figs. 2 and 3, which are held firmly to the frame A by the screws V, V, Figs. 2 and 3. On the outer end of the shaft B I secure a balance or drive wheel seen at H, Figs. 1 and 3 for propelling the machine, by the application of any known motor. To the central portion of the shaft B, is fixed the pulley C, Figs. 1, 2, and 3, for revolving the cutter head F, shaft E, and pulley D, with great velocity by the belt P, Figs. 1, 2 and 3. It will be readily understood that this class of cutter heads for sticking moldings and window sash must be revolved with great velocity, which prevents using economically more than one cutting iron, by reason of its great velocity, and because the cutting irons have to be ground and "set" often which is easily done with one cutter but not so when there are more than one. And it is of course necessary that the cutter heads should be exactly balanced in order to finish the moldings smooth.

By neglecting to correctly balance the cutter head too frequently results in disastrous and fatal consequences, and it is also well known by persons skilled in this branch of business, that the constant grinding or sharpening of the irons or cutters tends as constantly to lighten them, and consequently unbalance the cutters, or cutter heads when these cutting tools are attached to them. The methods heretofore adopted to balance these revolving cutter heads, has been to attach the two cutters to the cutter head, and this head to the shaft on which it is to be used, then place them onto a level straight edge, which will then indicate the heaviest part of the periphery which when so ascertained, is removed with a file or drill, and this tedious operation has to be renewed every time the cutting irons are ground, or else the cutter heads left unbalanced which endangers the life and limb of the person every moment while tending it. This method is pursued until the cutting irons are worn out; then the half of the cutter head opposite which the irons are placed is very much too light for being in balance when new cutting irons are put on for use, and the old method heretofore adopted for obviating this difficulty is to screw on a piece of lead to the opposite side or surface of the head F from where the cutting irons are secured to renew or replace the solid material previously removed from the cutter head to keep it in balance, which lead is reduced from time to time for again balancing the head, which is as bungling a method as the first named.

The object of my invention is for giving an adjustable balance to the cutter heads, whereby they can be instantly, conveniently, and nicely balanced as the cutters are reduced by grinding or otherwise which I effect as follows: First the cutter head is constructed of wrought or malleable iron as seen at F, Figs. 2 and 4, one of the sides of the cutter head F is faced to receive the steel cutter G, Figs. 1, 2 and 4 which is fastened to the head F, by the screw J passing through the slot K of the cutter G, and then into the head F as seen at Figs. 1, 2, and 4. The opposite side of this cutter head is drilled and threaded so as to receive one or more metal balancing screw plugs seen at M Figs. 1, 2 and 4 so that they may be easily and instantly turned inward toward the center or outward from the center, which will of course balance the cutter head to a nicety, the screw N acting as a check to hold the balancing plug in any desired position which it has been placed, or turned to balance the cutter G, and cutter head F Figs. 1, 2, and 4. I fit and secure the cutter head F to the cutter shaft E which is properly fitted so as to turn in firm boxes or bearings seen at V Fig. 1, which are held to the frame A by the screws W Fig. 1. On the shaft E is placed and secured the pulley D over which passes the belt P from the driving pulley C for propelling the cutter head F. I construct a table or platen seen at L Figs. 1, 2, and 3 over which the moldings are passed to be shaped, on the inside of which table I fasten the gibs seen at R, Fig. 3, by the screws S, they being adjusted and held to the table L by the screws S, Fig. 3. These gibs are fitted to, and slide up and down upon the ways or track Q Figs. 2 and 3. I construct a crank screw seen at I, Figs. 1, 2, and 3 and adjust it to the table L so as to raise it by passing it through the fixed nut O, Fig. 3 which is fastened to the table L so that all which is necessary to do to raise or lower the table L, is to turn one screw as will readily be seen.

It will be understood that common smooth and fluted feed rolls are well known, and used for planing boards and plank, such rolls will not answer for feeding moldings for the reason, that it is necessary to feed these moldings along over a smooth table, and a smooth or fluted roll would slip, or would not feed in that manner, by reason of friction of the molding upon the table, and the large amount of wood to be removed from the molding by the cutters. Therefore the nature, novelty, and object of my invention, is the construction and operation of a feed wheel with a series of long slim sharp pointed teeth as hereafter described, which deeply enter such part of the wood for the molding as is to be afterward removed or channeled out by the shaping cutters. No feed wheel like this would answer for feeding boards or plank, hence the difference between the fluted or smooth feed rolls, and the feed wheel as invented by me.

A long table with straight top must be used to feed the moldings, over, in order that they may be formed straight, the length of table prevents the moldings from setting down where there is recesses or imperfections in the wood, or if chips should get under the molding during the finishing they will not prevent a uniform surface being formed on the molding.

I construct a spur feed wheel, the necessity of which has just been mentioned seen at $M^2$ with long sharp pointed teeth which points $i$, may be any desired shape, round, square, or octagon, set at any angle, or at an angle half way between the axis of motion of the spur feed shaft and a right angle with this axis, which is diamonding with the feed of the wood for penetrating the wood deeply, seen at $i$, Fig. 5, for forcing it along by entering such part of the wood as is afterward removed from the molding by the cutter G, see red line, Fig. 5. This feed wheel is so arranged as to be moved, and fixed laterally on its shaft $E^2$ by screw $L^2$ in order to allow the long points or teeth to enter deeply any desired portion of the wood, for the intended molding which is afterward to be removed by the cutter G, and the end of the shaft $E^2$ over the table L turns in a slot seen in dotted lines at Fig. 2, and this is so as to allow the inequalities of the wood to raise or lower it, while being pressed down by the spring $H^2$ which is secured to the frame A, by the screw $I^2$. One end of the feed wheel shaft $E^2$ is kept in position by the cap $G^2$ Fig. 1 and the other end of the shaft $E^2$ on which the feed wheel is placed, is held down elastically by the spring $H^2$ Figs. 1 and 2.

On the out end of the feed shaft $E^2$ I secure a pulley seen at $F^2$ which is driven by belt $O^2$ from the small pulley $N^2$ which is fixed to the shaft $A^2$ and this shaft has a large pulley fixed to it seen at $B^2$ which is driven by belt $C^2$ from pulley $D^2$ on the main drive shaft B, by this arrangement a slow revolving motion is imparted to the feed wheel $M^2$ to feed the wood properly forward while the drive shaft from which it is driven revolves with great rapidity, I form a shaft seen at $R^2$ at the end of which is secured a friction spring seen at $K^2$ Figs. 1 and 2 to pass down the molding which is being formed upon the table L while the cutter G is shaping it as may be desired, the shaft $R^2$ is made adjustable laterally, and the spring $K^2$ both laterally and vertically by this shaft and the screw $J^2$ Figs. 1 and 2, in order that this pressure guide may be instantly adjusted too, and secured in any desired position where it may bear upon, but not mar the finished portion of the molding; while steadying it upon the table L, during its passing and receiving shape from the cutter G.

For economy in material, as well as to save work, or rendering a revolving cutter practical, in shaping the molding it is necessary that the pieces for them should be sawed from the plank or piece as near the desired shape e. g. Fig. 5 at L³, for the molding as is practical, and then it is necessary, in such shape to feed them effectually by the spurs $i$ of the feed wheel M², entering deeply into such portion of it as is to be immediately removed by the shaping cutter G, the channel formed being so narrow as to allow, only sharp points $i$, to enter for feed, into such place as the channel is afterward to be cut, all as heretofore described.

I claim—

The relative arrangement and combination of the spur feed wheel M², with the cutter head F, and table L. They being adjustable with each other in the manner described and for the purposes set forth.

HEZEKIAH B. SMITH.

Witnesses:
 E. W. SCOTT,
 ALFRED NOURLOURN.